July 9, 1940.
J. E. DIAMOND
2,207,446
SYNCHRONIZER
Original Filed Oct. 10, 1933    5 Sheets-Sheet 1
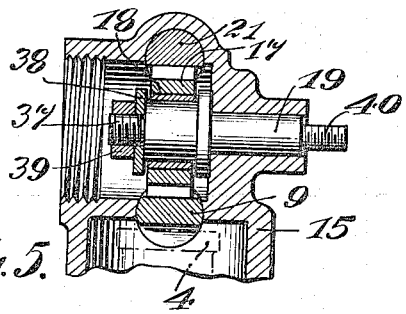
Fig. 5.
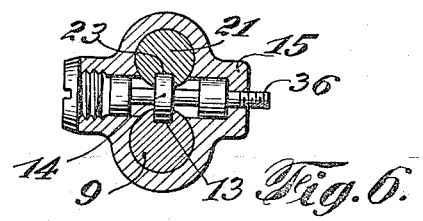
Fig. 6.
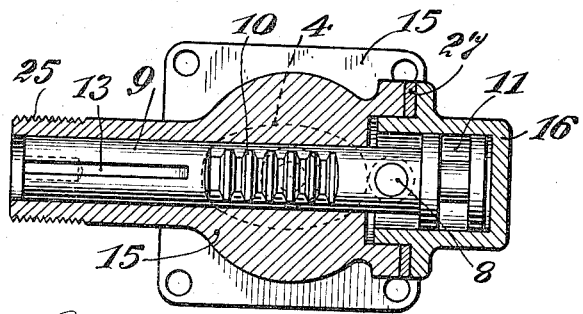
Fig. 3.
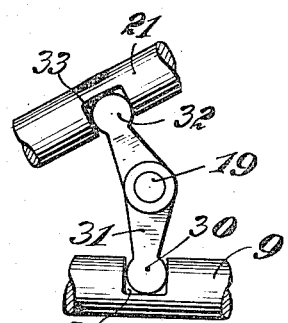
Fig. 4.
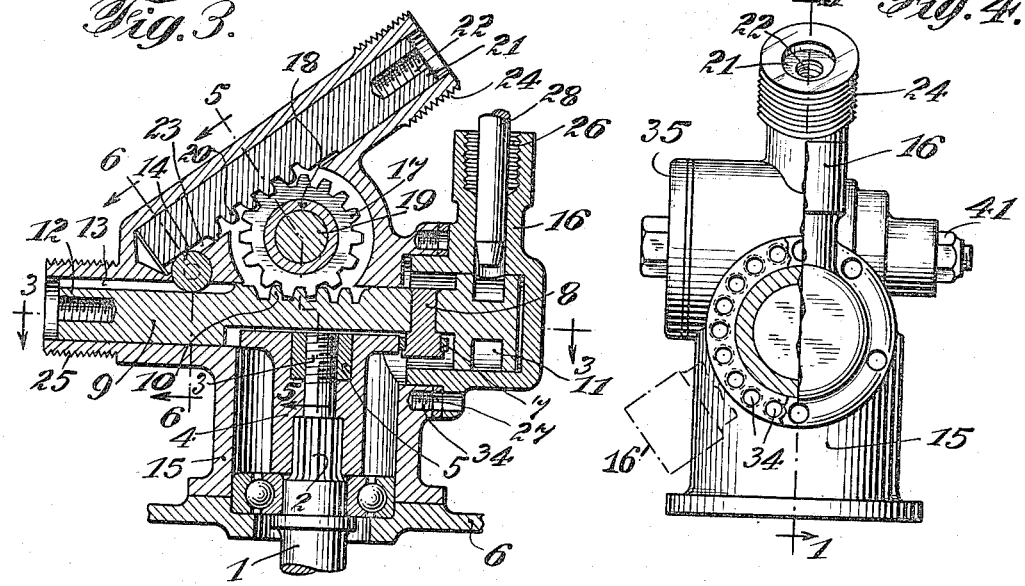
Fig. 1.
Fig. 2.
INVENTOR
James E. Diamond
BY
his ATTORNEYS July 9, 1940.  J. E. DIAMOND  2,207,446
SYNCHRONIZER
Original Filed Oct. 10, 1933   5 Sheets-Sheet 2
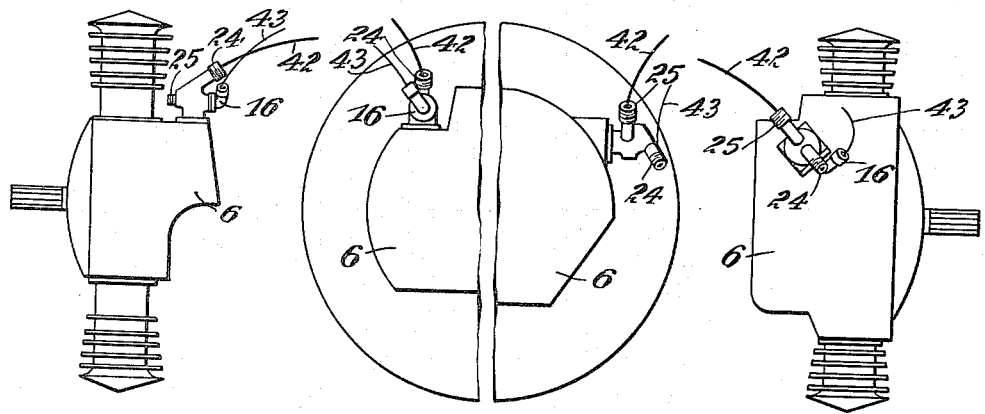
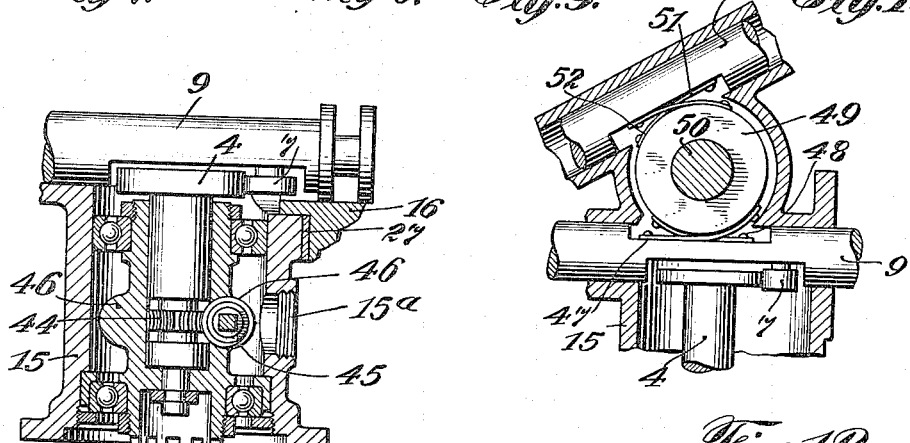
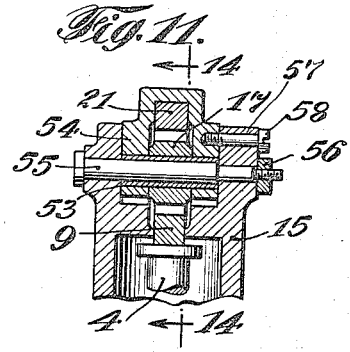
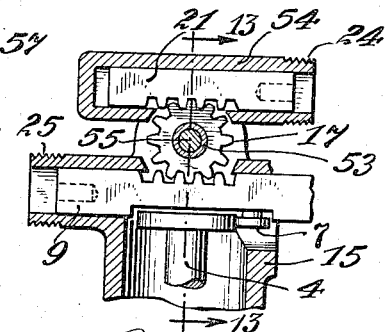
INVENTOR
James E. Diamond
BY
his ATTORNEYS July 9, 1940.  J. E. DIAMOND  2,207,446
SYNCHRONIZER
Original Filed Oct. 10, 1933  5 Sheets-Sheet 3
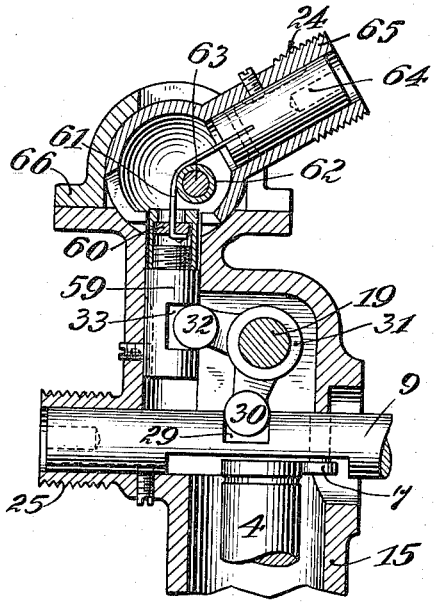
Fig.16.
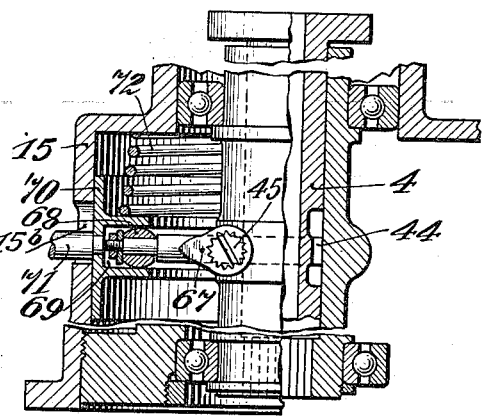
Fig.17.
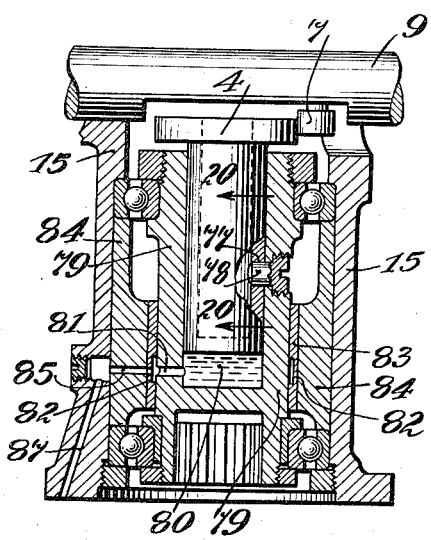
Fig.19.
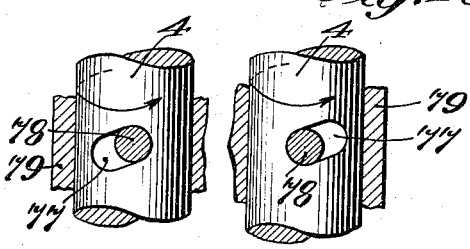
Fig.18.
Fig.20. Fig.21.
INVENTOR
James E. Diamond
BY
his ATTORNEYS

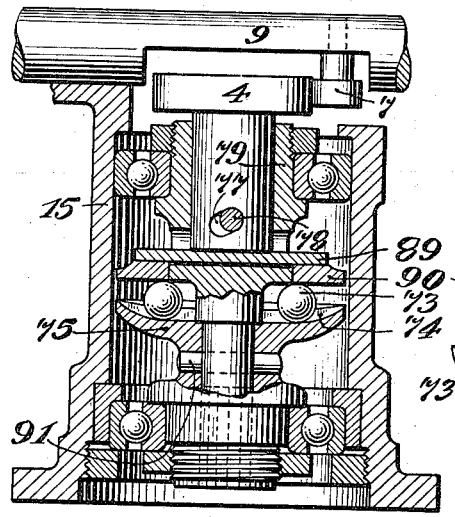

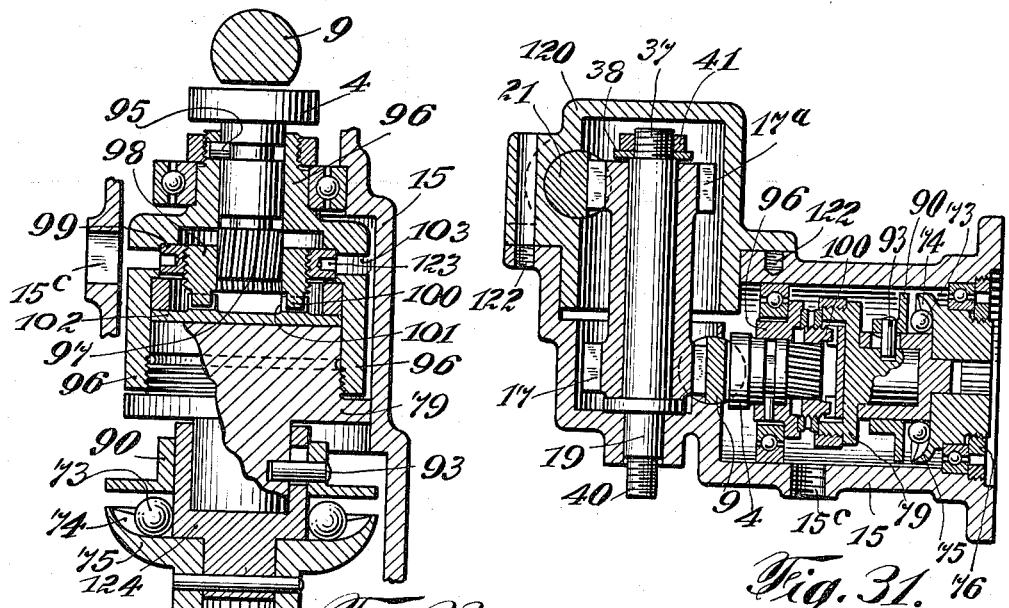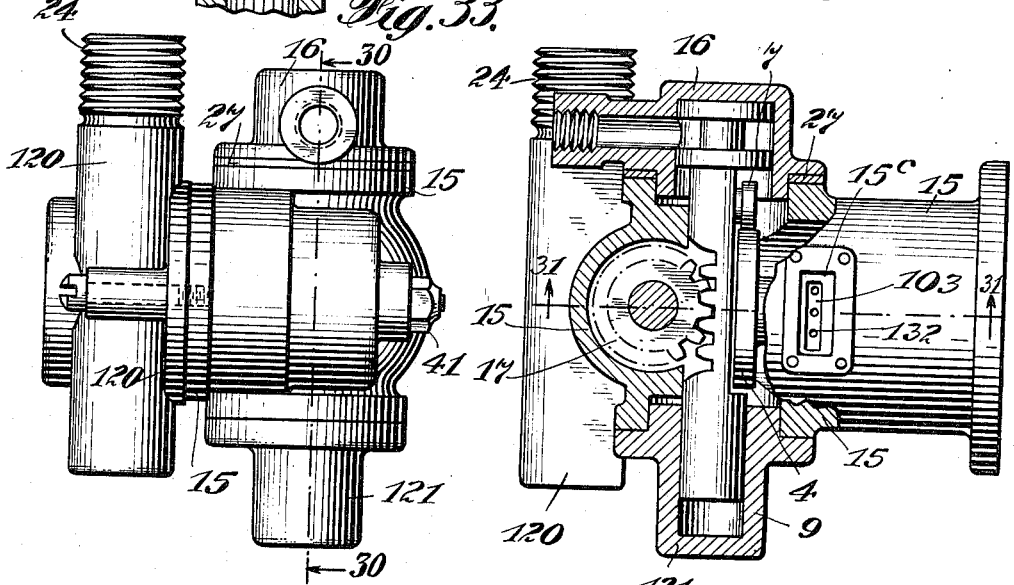

Patented July 9, 1940

2,207,446

UNITED STATES PATENT OFFICE 2,207,446

SYNCHRONIZER

James E. Diamond, White Plains, N. Y.

Application October 10, 1933, Serial No. 692,932
Renewed March 27, 1937

22 Claims. (Cl. 89—27)

As is well known in the art, in military planes, especially in the combat type, in which machine guns are fixed immovably with respect to the aircraft, it is usually desirable to mount the guns on, or, in the fuselage. This mounting almost invariably brings the line of fire of guns so mounted within the periphery described by the propeller, that it is within what is known as the propeller disk area, since combat planes are at the present time, without exception, of the tractor type, which for the benefit of those not familiar with aircraft structures, is the one where the propeller is, or the propellers are, in advance of the leading edge or edges of the wing or wings.

As will be appreciated, a definite relation must be established between the positions of the propeller blades, of which there are always two or more, and the time at which a machine gun is permitted to fire. In other words the firing of the machine gun must be synchronized with respect to the movement of the propeller. Many avenues have been followed in attempting to reach a satisfactory solution of this problem. Many methods of attaining synchronization have been tried. Among those have been ones based upon the laws of hydraulics. Other attempts have been made to utilize electric apparatus, but each has disclosed drawbacks sufficiently weighty in the light of experience to date to show the wisdom of using a synchronizer having as its principle, the establishment of a direct mechanical relationship between the propeller and the machine gun. In present practice this is effected by means of gearing, the propeller shaft being at one end of the train and some means of power take-off at the other. This train usually terminates in a form which, ultimately, either directly or indirectly should be able, at will, to convert rotary into reciprocating motion. The reciprocating element may be, and is usually termed an impulse motor, and it, in turn, by means of a flexible cable attached thereto, the reciprocation of which is a function thereof, controls the firing pin of a machine gun or other similar mechanism.

This flexible cable, hereafter termed the impulse cable attached to the firing pin, which latter is always under sufficient spring-loading to fire a cartridge, as the name implies, may be flexed, within limits, to couple the firing pin of the machine gun to the impulse motor, a component of the synchronizing device itself. This limit of flexure is, however, a very definite consideration in devising successful installations. It must be borne in mind that an engine location is very precisely fixed with respect to a plane structure, and while on the other hand, there is some latitude as to the exact location of a machine gun or pair of machine guns with respect to the same structure, this latitude is decidedly narrow. It therefore becomes necessary with the scope of possibilities narrowed down by the limitations imposed by the structure design of the airplane, and limitations imposed by the means of attachment of engine to gun, to conform the direction of reciprocation of the synchronizer impulse motor to meet these recited conditions. It is of course feasible to convert rotary into reciprocating motion at an angle, and precisely this must be done in many installations.

The requirement introduced by the limitations imposed in the use of some flexible means of connection such as that earlier described also enters into the problem in another respect. The trigger control mechanism is similarly based on the employment of some flexible means of attachment between the cock-pit (usually the trigger or triggers are on the control stick) and the trigger pin or pins that release or arrest at will the functioning of the synchronizer or synchronizers, and consequently functioning of the gun or guns. As a result of such additional limitation springing from the use of a flexible mechanism, there has been hitherto not much latitude allowed in the choice of location of the trigger pin with respect to the rest of the synchronizer, bearing in mind the fact that the angularity between control stick and trigger pins must be held within certain limits. The significance of this is that while by a more or less involved or complicated and weighty mechanism solutions are offered to the problem of proper take-off, directionally, for the impulse motor, that is, the prime-mover, operating the firing pin of the machine gun, the relation, directionally, of the trigger pin controlling the operation of the impulse motor—with respect to the airplane structure—will not be the same with any two different types of aircraft. The trigger-pin aspect, axially, may happen to be ideal for one type of combat ship, but the imposed angularity in the flexible connection between cock-pit and synchronizer, in another type of fighter may, from a mechanical standpoint, be highly undesirable, even if possible, that is, with the selfsame synchronizer, forcing a redesign of portions of the latter to meet the new condition.

It may be well to discuss the present practice in placing propeller and machine gun into synchrony. With practically all previous synchronizers the relationship between propeller and machine gun is a function of the position of the gun synchronizer drive shaft, a detail of the engine assembly, and some driven member of synchronizer proper. Ordinarily the former shaft terminates with some positive form of drive connection, splines for example. A mating gear may be assembled at this point. This gear will mesh with a gear which is one of a train of gears in the synchronizer proper. The procedure is to correctly place the former gear on the gun synchronizer drive shaft splining, a matter of experience and judgment, and then to mount the synchronizer meshing the gear to be driven also in approximately the correct setting of the latter. The synchronizer being in place, the synchronizer impulse motor is attached to the machine gun mechanism by means of the flexible cable hereinbefore mentioned. Observation is made as the propeller is turned by hand as to the point of fire, and the position of the propeller. If not correct, the synchronizer must be removed, and the relationship of the driving shaft to the driven member changed.

It will be observed this is a trial-and-error method, which in view of the necessity of removing the synchronizer from its position on the engine to effect the correction desired, is time-consuming; and a length of time may conceivably be consumed that, in times of emergency, would prove fatal. A highly desirable condition is the elimination of the necessity of removal of the synchronizer proper in establishing a proper relationship between propeller and machine gun. Mechanical and mathematical considerations are factors in arriving at a quick synchronization.

Unusual conditions of flight introduce other considerations that are pertinent. It frequently happens that with the trend toward higher and higher engine powers, that the use of a two-blade propeller of sufficient diameter to utilize efficiently the power output of such engines is not feasible because of the ground clearance required, this in turn forcing the use of landing gear of excessive height to insure proper ground clearance, introducing unwanted parasitic resistance, etc. One solution is the use of a propeller smaller in diameter, but with a larger number of blades, usually three. Under normal conditions, synchronization here, is not relatively much more difficult than in the case of the two-bladed propeller in spite of the smaller track and time element allowed for firing. However one type of military or fighting maneuver known as power diving introduce an entirely new element. In this maneuver the revolution of the propeller is at a vastly accelerated rate, occasionally approximately doubling. In view of this higher rate of turning, and decreased circumferential length of clear path between blades, one-third less in the case of a three-blade, in comparison with a two-blade propeller, the lag in the cam follower in its follow of the cam may destroy the necessary synchrony. The advance of the cam when these unusual conditions are prevailing will compensate for the lag recited. A mechanism making provision for automatically advancing its cam when such conditions of flight are imposed on an engine is the ideal.

One of the objects of my invention is the elimination of involved systems of gearing or equivalent in the conversion of rotary into reciprocating motion at angles other than at right angles as well as at right angles, thereto.

Another object of my invention is the conversion of rotary into reciprocating motion at angles other than at right angles with the axis of the reciprocating member or members in the same plane as the axis of the revolving member, eliminating the staggering or offsetting otherwise involved, with the imposed consequence of increased weight—a factor of importance in aircraft engines or aircraft accessories.

Still another object is the reduction of the number of elements entering into such a device, with consequent reduction in the degree of cumulative back-lash incident to operating wear.

My invention has another object: the elimination of all possibility of wear at times that the synchronizer is not performing its function as a meter of gunfire.

Still another object is the attainment of some latitude in the choice of the angularity of the angular take-off.

Another object of my invention is to introduce an element of latitude in the position of the trigger pin control mechanism with respect to the rest of the unit, thereby facilitating installation of the flexible control assembly.

Another object in view is the elimination of the repetitious and trial-and-error labor now necessary in establishing proper relationship between propeller and gun.

Another object of my invention is to make the synchronizer an entirely self-contained unit.

Another object of my invention is to make available a synchronizer having a wide scope of applicability.

Another object is to meet the requirements imposed on a synchronizer when called upon to function during a period in which a propeller is turning at abnormally high speed, such as during a power-dive.

Still another object is to meet in a very simple way, retaining the benefits of my invention, the problem imposed if the power supply given the synchronizer must be delivered to an offset impulse motor cable.

I refer now to the drawings.

Figure 1 is a longitudinal cross-section on line 1—1 in Figure 2.

Figure 2 is an end view with one-half of the trigger pin housing removed.

Figure 3 is a transverse section on line 3—3 in Figure 1.

Figure 4 is a detail showing an alternate construction.

Figure 5 is a section on line 5—5 in Figure 1.

Figure 6 is a section on line 6—6 in Figure 1.

Figure 7 is a diagrammatic view.

Figure 8 is a side elevation of Figure 7.

Figure 9 is a diagrammatic view.

Figure 10 is a side elevation of Figure 9.

Figure 11 is a fragmentary detail showing another form.

Figure 12 is a similarly fragmentary showing an alternate construction.

Figure 13 shows another fragmentary construction, being a section on line 13—13 in Figure 14.

Figure 14 is a section on line 14—14 in Figure 13.

Figure 15 is a detail of construction pertinent to Figures 13 and 14.

Figure 16 is a vertical section through a modified form of the invention.

Figure 17 is a vertical section through a modified form of cam operating mechanism.

Figure 18 is an enlarged fragmentary vertical section showing a modified arrangement for part of the mechanism of Fig. 17.

Figure 19 is a vertical section through still another form of operating mechanism.

Figures 20 and 21 are fragmentary enlargements of parts of the mechanism of Fig. 19 shown in two different relative positions.

Figure 22 is a detail in vertical section of another form of operating mechanism.

Figure 23 is an enlarged fragmentary vertical section showing a modified arrangement for part of the mechanism of Fig. 22.

Figure 24 is a fragmentary enlargement of part of the mechanism shown in Fig. 23.

Figure 25 is a vertical section through still another form of operating mechanism.

Figure 26 is a vertical section in enlargement showing the manner in which teeth incorporated in the mechanism of Fig. 25 are in mesh.

Figure 27 is a diagrammatic view.

Figure 28 is a plan view.

Figure 29 is a plan view.

Figure 30 is a view partially in section on substantially the line 30—30 of Fig. 32.

Figure 31 is a section on line 31—31 of Figure 30.

Figure 32 is a top view pertaining to Figures 30 and 31.

Figure 33 is an enlarged detail in section of a portion of Figure 31 on line 31—31 of Figure 30.

Before considering the drawings in detail it may be well to recite or restate specifically some of the problems to be met. One is to convert rotary into reciprocating motion at various angles, with respect to the axis of rotation, in a simple direct mechanical way, with a minimum of parts and with a minimum of weight, and to do this in such a way as to reduce wear to an absolute minimum. In terms of the design shown in Figure 1, the problem stands to convert the rotary motion of gun synchronizer drive shaft, 1, into reciprocating motion at an obtuse angularity relative thereto and definite in magnitude at threaded hole, 22, whereto is attached an impulse cable definitely controlling the fire of a machine gun some distance away.

It should not be understood that the scope of the construction being discussed is to be considered as limited to angularity in the same plane as that in which falls the gun synchronizer drive shaft.

It will be obvious that if due to the presence of some body such as an accessory that may be so located as to interfere with the construction indicated above, the principle here involved lends itself well to meeting such a situation, by permitting whatever offsetting may be necessary to clear what would otherwise be in its way, with the maximum of simplicity and the minimum of weight.

One of the forms of my invention is based on the use of two simple racks co-acting with a pinion.

I refer now specifically to the drawings.

In Figure 1, 1 is one of the engine accessory drive shafts terminating outside the engine crankcase, and hereafter called the gun synchronizer drive shaft, and having at its outer extremity splines 2 or similar provision for positively driving a synchronizer unit, and means 3, in this case the well-known screw threading to retain in place cam 4, usually elliptical in profile or contour, and locked in place by nut 5 becoming an integral part of the gun synchronizer drive shaft 1 which in the case shown turns in an antifriction bearing housed in engine crankcase 6. The face of cam 4 rolls against roller 7 which is free to rotate on stud 8 which is an attached part of the cam follower and impulse motor shaft 9 having formed on one portion a series of teeth 10 and in an enlarged portion at one end an annular channel 11, and at the other a threaded hole 12, or other means for attachment of an impulse cable, and likewise a keyway 13, co-acting with key 14, the shaft reciprocating in synchronizer housing 15, and trigger pin housing 16, as bearings. Rack teeth 10 mesh with the gear teeth on pinion 17, bushed with bearing 18, oscillating on pinion stud 19, retained in housing 15. The teeth on pinion 17 mesh with rack teeth formed on a portion of secondary impulse motor shaft 21 in one end of which is a threaded hole 22 for attachment of an impulse cable 42; there is also formed in this shaft 21, keyway 23 co-acting with key 14, hitherto mentioned.

Secondary impulse motor shaft 21 reciprocates in the bore provided for it in synchronizer housing 15. 24 and 25 are threaded portions providing means of attachment for the flexible tubing armoring or protecting the impulse cable 42, which whether connected to member 9 or member 21, is operated from the gun to exert a pull on member 9 or 21 with the result that the roller may be kept in operative contact with cam 4 while trigger pin 28 is retracted from channel 11. In other words, referring to Figure 1, the pull of cable 42 moves member 9 to the left, cam 4 moves it back to the right, and the presence of pin 28 in channel 11 keeps member 9 in the Figure 1 position. 26 is a threaded hole into which is screwed the standard trigger pin mechanism. 27 is a distance shim by means of which a desired relationship hereafter discussed may be established between the rolling face of cam 4 and roller 7, this shim being interposed between synchronizer body 15 and trigger pin housing 16. 28 typifies the trigger pin. Essentially the trigger pin mechanism is a device incorporating a spring under compression the function of which is to maintain trigger pin 28 in annular channel 11, except as retracted therefrom by the pulling of the trigger proper by the pilot, the translation of motion between cockpit and synchronizer being by means of the flexible trigger cable hitherto mentioned. In practice cam 4 is so positioned on splines 2 that when said cam has its major axis coincident in direction with that of the cam follower and primary impulse motor, the firing pin of the machine gun connected therewith by means of the provisions shown at 12 and 22 for attachment of the impulse cable, is restrained from firing the cartridge in the firing chamber. This cam setting is of course directly related to the position of the propeller with respect to the line of fire of the machine gun controlled by the impulse motor in question. This position having been determined, shim, 27, and of sufficient thickness to insure retraction of roller, 7, from the rolling face of cam 4—a matter of several thousandths of an inch—when the end trigger pin 28 is bottomed in annular channel 11. The end of trigger pin 28 is either generously filleted or tapered to insure entry regardless of the frequency of reciprocation of either cam follower and primary impulse motor shaft 9 or secondary impulse motor shaft 21. It will be understood that the length of the stroke or reciprocation of the cam follower and primary impulse motor shaft 9 is a function of the relation between major and minor axes of cam 4. And, due to the geared relationship between the former and secondary impulse motor shaft 21, the length of stroke of the latter is a similar function. It will be noted that in the construction shown, the angular take-off is disposed directly over the engine gun synchronizer drive shaft. In practice an angularity of approximately 35 degrees has been found expedient. In the particular construction shown, this angularity is rigidly fixed in the design of the synchronizer housing. It will be appreciated that with the construction shown, the synchronizer housing, by design, may offer any desired rigid angularity. It will further be observed that when the cam follower and primary impulse motor shaft 9 is retracted from its functioning position, that is when the trigger pin 28 has bottomed in annular channel 11, drawing roller 7 out of contact with the roller face of cam 4, the entire mechanism, cam follower and impulse motor shaft 9, pinion 17 and secondary impulse motor shaft 21 is disengaged, inoperative and stationary, cam 4, turning idly in space. The importance of this may not be too highly stressed, when it is borne in mind that the speeds involved are very high, the matter of wear in its effect on correct synchronization, a matter of near hairline adjustment, is a vital consideration. Hitherto to attain an approximation of the desired angularity, recourse has been had to a train of gears, and the conversion of rotary into reciprocating motion imposed by the necessities of the case has been at the far end of the train, with respect to the driving medium. The significance of this is that regardless of functioning, or non-functioning of the recirocating or cam following element, the gears in the train are turning continuously during the operating of the engine. When it is realized that with a two-lobe cam, one in which it may be assumed that the radii composing the major axis are equal, turning at engine speed, approximately 2000 R. P. M. the cam follower is reciprocating 8000 times a minute, some idea will be gained of the speeds involved. When it is further appreciated that the average aircraft machine gun cartridge belt normally carries but 1200 rounds, and only one belt per gun is the normal ammunition supply for combat planes, replenishment requires grounding. Further, the average machine gun "burst" consists usually of approximately 25 rounds—a time element of one and one-half seconds. From the foregoing, the small percentages of time a gun synchronizer is called upon to function in comparison with the hours of service demanded of an engine is impressively apparent. As previously stated, wear is an unwelcome factor, since synchrony at the high speeds involved is so critical that wear however slight may be just enough to destroy the synchronization between gun and propeller with its understood disastrous results if the gun is fired with this condition existing while the plane is in flight.

It will be observed that in my invention, there can be absolutely no wear when the synchronizer is not performing its mission in controlling the firing of a machine gun. It is purely an inert mechanism.

It will be noted that the operation of secondary impulse motor shaft 21 is in phase with the operation of cam follower and primary impulse motor shaft 9. For a two-blade propeller this difference in phase is without significance. It may be well to point out that in no installation will impulse be taken from both impulse motor shafts. Where a machine gun is to be synchronized to "shoot thru"—a three blade propeller, provision for such requirement is made in the design of cam 4 and the proper phase relation established for whichever particular impulse motor shaft 9 or 21 is to be utilized.

Figure 2 which is an end view of the synchronizer shown in Figure 1, has one-half of the trigger pin housing, 16, removed. A series of tapped holes, 34, is revealed. These holes may be as close together as good machining will permit. It will be noted that orientation of trigger pin housing, 16, is thereby made possible. A possible position is shown in the dot and dash line. For example, if space permits the placing of 36 equally spaced holes on the trigger pin housing mounting flange on synchronizer housing, 15, the positioning of the trigger pin housing may be made to conform to within 10 degrees of any desired position, greatly facilitating the installation of the flexible trigger cable, which, like the impulse cable is carried within a flexible tube.

Figure 3, a top view, partially in section, shows the disposition of the rack teeth 10 on cam follower and primary impulse motor shaft 9, the keyway 13, the channel 11, making clear the ability to orient trigger pin housing 16, and contained trigger pin 28, about cam follower and primary impulse motor 9 as a trunnion. By means of dotted line, the profile of cam 4, typical for a two-lobe cam, is shown.

Figure 4 shows the use of a bell-crank in place of a pinion gear. In the figure in question, a slot 29 is formed in cam follower and primary impulse motor shaft 9, the sides of which slot may conform in contour with a gear tooth, and co-acting with which is the formed end 30, which may similarly be a gear tooth in form, of bell crank 31 free to oscillate on stud 19, the other end 32 of the bell-crank, subject to the same treatment as end 30 co-acting in slot 33—this, too, subject to the same treatment as slot 29—in secondary impulse motor shaft 21. The operation of the synchronizer, of course, remains the same. The use of a pinion gear offers one advantage over the bell-crank construction, in that the pinion gear may be removed and then put back in a new position presenting unworn teeth, since only a fraction of the teeth are in engagement with those of the racks.

Figure 5, a detail of a section on line 5—5 in Figure 1, is more or less self-explanatory. Cam 4 is shown with respect to cam follower and primary impulse motor 9, slidable in a bore in housing 15, pinion gear 17, pinion gear bearing bushing 18, and pinion gear stud 19, and means for holding the pinion in its place, in synchronizer housing, at one end washer 38 retained by nut 39 by means of threading 37 on stud 19, and at the other, threading 40 on stud 19 and nut 41, shown in Figure 1. Secondary impulse motor 21 slidable in a bore in synchronizer 15 is shown in relation to pinion gear 17.

Figure 6, a detail in section on 6—6 in Figure 1, shows one method of using a common key to maintain a definite relationship between three units. In Figure 6, key 14, definitely located in position in a properly located transverse bore in synchronizer housing 15, co-acts with the keyway 13, formed in cam follower and primary impulse motor shaft 9, and keyway 23, formed in secondary impulse motor shaft 21. This key insures the maintenance of the proper pitch line relationship between rack teeth 10 on cam follower and primary impulse motor shaft 9, pinion gear 17, and rack teeth 20, on secondary impulse motor shaft 21. It is not to be understood that I confine myself to this type of key and keyway construction. The keyways may be disposed wherever convenient, and the keys similarly. However the construction shown calls for the use of but one piece and that negligible in weight. Key 14 is held laterally, and against any tendency to rotate by means of a nut, not shown, on threaded end 36 of key 14.

Figure 7 is a diagrammatic view of the well-known static radial type of aircraft engine. The disposition relative thereto of my synchronizing mechanism is shown when the gun synchronizer drive shaft is, with respect to the crank-case 6, in more or less a vertical position. In the drawings, the impulse cable 42, is cooperative with secondary impulse motor shaft 21, not shown. Trigger pin cable 43, similarly is cooperative with trigger pin 28 not shown.

In Figure 8 which is a side elevation of Figure 7, is shown trigger pin housing 16, oriented to meet a certain hypothetical condition.

Figure 9 is a diagrammatic view of the rear of the well-known static radial type of aircraft engine, similar to that shown in Figures 7 and 8, except that in this case the gun synchronizer drive shaft is disposed more or less horizontally with respect to the engine crank-case 6. In this case the desired angularity, though not always, may be attained by the orientation of the synchronizer about its base, and attaching to the mounting flange on engine crank-case 6 provision for such orientation being made in somewhat similar fashion to that utilized for the same purpose in the case of trigger pin housing 16 with respect to synchronizer body 15 on the hypothetical case in point, impulse cable 42 is cooperative with cam follower and primary impulse motor shaft 9, not shown.

In Figure 10, which is a side view of Figure 9, the view of the synchronizer unit is a top view, and the method followed in attaining a desired angularity of take-off will be clearly understood. In this figure impulse cable 42 and trigger pin cable 43 are shown.

As has been previously mentioned, the usual procedure hitherto followed in bringing propeller and machine gun into synchrony has been one of trial and error. This is more or less a time-consuming operation, and to eliminate that I show in Figure 11 an application of the mechanical combination of worm and wheel. In the figure in question, the shaft, an integral part of which is cam 4 shows a worm wheel formed thereon. Cam 4, which hitherto has been, in effect, a part of the engine assembly, being attached to the engine gun synchronizer drive shaft, is here shown as an integral part of the synchronizer proper, splines, dogs, or other means of positive drive at the outer or lower end of aforesaid shaft mating with a similarly disposed end of cam carrier sleeve 46, correct axial and radial placement of the latter being easily attained, and here shown accomplished by means of sleeve 46, which is rotatable on anti-friction bearings within cam carrier sleeve 46, the lower end of which is connected to the engine shaft. Suitably journalled in sleeve 46 is worm 45. Worm 45 meshes with worm wheel 44. It will be appreciated that if worm 45 is turned, worm wheel 44, an integral part of cam 4, must revolve, albeit, only minutely in travel relative to worm 45 and in sleeve 46. The ratio between worm and worm wheel is a matter of choice. Means are provided for manual turning of the worm 45, through opening, 15a, in synchronizer body, 15. The wormshaft may be square ended, or a screw-driver slot provided. The means thus afforded it will at once be appreciated, eliminate the necessity of removing a synchronizer unit from its place on the engine in order to realize the desired cam setting to bring about the necessary synchrony between propeller and machine gun. It will be appreciated that sleeve 46, becomes in effect an integral part of the engine gun synchronizer drive shaft, and, in turn, worm 45 becomes a key, connecting the driving sleeve 46 and cam 4.

Figure 12 shows the substitution of a roller or pulley and flexible connectors—such as clock spring steel, as the intermediary between the cam follower and primary impulse motor shaft and the secondary impulse motor shaft. In the drawings, primary impulse motor shaft 9 is attached to pulley or roller 49 turning on stud 50 by means of flexible connectors 47 and 48. Roller 49 is in turn connected with secondary impulse motor 21 by means of straps 51 and 52. It should be noted that the disposition of the straps, compels absolute response of secondary impulse motor shaft 21 to the primary 9. Of course, a single strap wrapped around roller 49 would function in precisely the same fashion. It should be observed that secondary motor shaft 21 could be disposed, if desired, otherwise than in the same plane as cam follower and primary impulse motor shaft 9. In order words, roller or pulley 49 could be a cylinder with straps 47 and 48 attached thereto at one end and straps 51 and 52 at the other.

Figures 13 and 14 show one method of attaining some latitude in the choice of the degree of angularity of the secondary impulse motor. In the detail shown in Figure 13 a section on line 13—13 of Figure 14, synchronizer housing 15 ceases to house secondary impulse motor shaft 21. The impulse motor shaft in question, reciprocates in a bore for the purpose in swivel housing 54 which may rotate, or swivel on sleeve 53 which in turn is located and locked in place by means of nut 56. Pinion 17 meshes with the two impulse motor shafts 9 and 21 and oscillates on sleeve 53. These two shafts in Figures 13 and 14 are shown as square in shape. Figure 14, a sectional detail on line 14—14 of Figure 13, is self-explanatory.

Figure 15 shows one method for locking swivel housing 54 at the desired angularity. A slot 57 formed in synchronizer housing 15 and a lock screw 58 as illustrated, serve the purpose indicated.

In Figure 16 is shown one detail of a construction utilizing the principle of the ball-joint for the purpose of attaining approximately universal angular adjustment within a hemispherical field for the secondary impulse motor shaft. Referring to the drawings, in lieu of a pinion gear, I show a bell-crank 31 a right-angled one, in this case co-acting with the primary impulse motor shaft 9 and an intermediate shaft 59. Attached to one end of said shaft 59 is a flexible connector 61, a strap in this case by means of a swivel 60. Strap 61 is attached to secondary impulse motor shaft 64 free to reciprocate in ball-ended housing 65. Ball-ended housing 65 may be swiveled in a vertical plane in any position to the vertical, from the horizontal to the vertical, the ball end of 65 being retained in ball socket housing 66. Ball socket housing, 66, may be oriented in a horizontal plane about the mating flange on synchronizer housing 15. It will be noted that strap, 61, runs over roller, 62, turning on pin, 63. This pin and roller assembly is so disposed as to assure minimum of change in relationship between ball-jointed housing, 65, and secondary impulse motor shaft 64. It will, of course, be evident that strap 61 could be directly connected with bell-crank end 32 by introducing means for swivelling at this point.

I have hitherto mentioned the problem of compensating for the lag in the firing pin mechanism, the train, so to speak, between the firing pin of the machine gun, and the actuating cam. The significance of all this is that the cam follower does not follow the cam closely enough. It is impracticable to utilize heavier springs in the firing pin system; therefore, attacking the problem from the other end, the answer is to advance the cam sufficiently to compensate for lag in the cam actuated mechanism. One way to accomplish this is shown in Figure 17.

I here use a worm and worm wheel, advancing the cam by turning the worm wheel, an integral part of the cam. In the drawing, worm 45 meshing with worm wheel 44 has a splined end, fitting on which is arm 67, terminating in a ball-roller 68 normally clear of either side of channel 69 formed in cylindrical sleeve 70, which is a sliding fit in a bore prepared for it in synchronizer housing 15. By means of stud 71 reaching the exterior of synchronizer housing 15 through opening 15b, sleeve 70 may be moved axially in synchronizer housing 15, this translation in turn brings one side of the channel 69 into contact with roller 68, this resulting in an angular movement of arm 67 and the worm 45 to which attached. The rotation of the worm 45 functioning with worm wheel 44 revolves cam 4, the amount of advancement being a function of the axial movement of sleeve 70, the length of arm 67, and the proportions of worm and worm wheel. Pin 71 may be connected with a control in the plane cock-pit for manual operation, the pilot advancing the cam prior to going into a power-dive in which it is intended to bring the machine gun or guns into play. Or a device utilizing centrifugal force, such as the well-known centrifugal governor may be employed, the force created being a function of the engine speed, and so arranged as not to function until the engine speed exceeds some predetermined R. P. M. In a case where the synchronizer is interconnected with a mechanism insuring an automatic advance it may sometimes be necessary to return sleeve 70 to normal position when a power dive is ended and for this purpose spring 72 is shown.

In Figure 18 a fragmentary detail shows means for advancing, automatically, the cam to meet the abnormal conditions existing during a power-dive as it effects gun synchronization. In the case shown, centrifugal force supplies the power required to advance the cam, and as an integral part of the synchronizer unit itself. I show the same elements disclosed in Figure 17 with the exception of an exteriorly projecting pin 71, to wit, worm 45 meshing with worm wheel 44, not shown, arm 67, ball roller 68, channel 69 in cylindrical sleeve 70. I may here add that the screw driver slot shown at the end of worm 45, is for the purpose of turning the worm to bring the cam to the correct position with respect to the engine gun synchronizer drive shaft at the time of the original installation. It will be understood that arm 67 has been removed during this operation. Again considering the drawings, I show a bowl-shaped governor body 75 retained as an integral part of sleeve 46, for purposes of illustration, I show this accomplished by means of locknut 76. Governor body 75 has formed in it a number of radial channels 74 in each one of which reposes a ball 73. These balls 73 are retained in place by the bowl-shaped nature of the governor body and the outside of one of the flanges which with the other, of cylindrical sleeve 70 forms channel 69. As sleeve 46, which may be considered for all practical purposes a part of the engine gun synchronizer drive shaft, turns, the centrifugal force created will cause all balls to move out radially, and the centrifugal force produced, bearing in mind that the latter is a function of the square of the velocity, attains considerable proportions. This force I make do useful work, and due to the contour of the ball track in the governor body, this centrifugal force is resolved into two components, one of these normal to the described flange of cylindrical sleeve 70. Up to a certain R. P. M. the sleeve being held in a position for normal cam operation, by means of spring 72 no utilized work will be done by the governor unit, but at abnormal engine speeds, the harnessed centrifugal force created will overcome the force of spring 72 and will move cylindrical sleeve 70 in the prepared bore in synchronizer housing 15 with the train of consequences recited in the description of Figure 17. It may be observed that the mechanical advantage residing in a worm and worm-wheel combination is great enough to warrant entire disregard of the force exerted by the cam following mechanism on the cam itself, as also being necessary to overcome. In view of the irreversible nature of the same combination spring 72 return cylindrical sleeve 70 to normal operating position when the engine is again operating at ordinary R. P. M's. This, of course, by virtue of the same procedure, but in reverse order, returns the cam to its original and ordinary operating position.

In Figure 19 is shown another method of advancing the cam. This view, while only a detailed section, shows the essential feature involved. Here I produce the desired advance either manually or automatically by hydraulic force. In this case I, in effect, make the cam a hydraulic piston controlling the piston action of the cam by means of a slot and a pin. Referring to the drawings, the essential parts of the synchronizer are shown, cam 4, roller 7, cam follower and impulse motor shaft 9, synchronizer housing 15, and anti-friction bearings for carrying both radial and thrust load. In addition is shown cylinder sleeve 79, which for purposes of explanation may be considered an extension of the engine gun synchronizer drive shaft. This is maintained in correct position in synchronizer body 15, by means of the anti-friction bearings mentioned, and distance sleeve 84. In cylinder sleeve 79 is cylinder chamber 80, into which is fitted, as if a piston, the shaft of cam 4. Cut into the cylindrical surface of said shaft of cam 4 is an elongated slot 77, shown clearly in Figures 20 and 21. Co-acting with this slot 77 is pin 78, retained in cylindrical sleeve 79. In normal operation, one end of slot 77 is retained against pin 79 by the pressure exerted on the face of cam 4 by roller 7 by virtue of the work being exacted from the synchronizer. However, hydraulic pressure may alter this relationship of slot and pin. Hydraulic chamber 80 is by means of passageway 85 through distance-sleeve 84 and passageway 87 in synchronizer housing 15 placed into communication with external means for producing a desired hydraulic pressure. This may be in connection with the regular oiling system of the engine, provision being made to utilize the much higher pressures existing when an engine is turning at an abnormally high speed. It may be a separate oil pump, functioning similarly. It may also be hydraulically connected with the cockpit, the equivalent of a hydraulic ram permitting the pilot, manually, to advance the cam prior to entering a power-dive when the gun is to be brought into play. In any of these cases due to the nature of the slot, when hydraulic pressure sufficient to overcome the load on cam 4 is effected in cylinder sleeve chamber 80 cam 4 will be forced outward, but its outward movement is controlled by pin 78 acting in slot 77. Due to the nature of the latter as cam 4 is forced outwardly, it must turn as well, in response to the control cited. The limit of outward movement and of advance is, of course, determined by the relationship that has been previously established. The design of cam follower and impulse motor shaft 9, as well as roller 7, must make provision for any outward movement of cam 4 that may occur. No provision need here be made to return cam 4 to normal operating position since the working load on cam 4 itself will return the latter to that place the instant the hydraulic pressure in chamber 80 is released.

Figures 20 and 21 show the relation of slot 77 and pin 78 the former in normal position, the latter in advanced operating condition.

In Figure 22, I show still another method of effecting automatic advance of a cam, the means therefor being an integral part of the synchronizer mechanism. I here utilize centrifugal force as the actuating power with a governor-like type of mechanism such as disclosed in Figure 18. However, I employ the centrifugal force, created when the abnormal operating conditions hitherto discussed, exist, in effecting an axial displacement of the cam, by virtue of which lateral displacement a rotary displacement is impressed on said cam. The degree of such rotation is a measure of the advance desired.

In the drawings, the components are as hitherto discussed, except that instead of a cylindrical sleeve 79 a thrust plate 90 becomes the laterally moving element in the centrifugal unit. Thrust plate 90 by virtue of crosspiece 89 may be considered with cam 4 as a unitary structure being attached thereto through openings in cam-carrying sleeve 79 which, as heretofore stated, may be simply considered as an extension of the engine gun synchronizer drive shaft.

As the centrifugal force created by the rotation of the ball train 73 attains a magnitude greater than the load being carried by cam 4, as determined by calculation, the lateral movement of thrust plate 90, in response thereto, necessarily will result in a lateral displacement of said cam 4 such lateral displacement having a rotary component by virtue of the limitation introduced in the employment of a pin 78 fixed in cam-carrying sleeve 79 and co-acting in slot 77 formed in cam 4. The relationship of pin and slot is established to attain the desired advance. Provision must necessarily be made in relationship of cam, roller and cam follower for the axial, or lateral, displacement of the first mentioned.

Figure 23 shows still another means for attaining automatic advance. The method disclosed is very similar to that shown in Figure 22, except that the necessity of providing in the mechanism for any axial or lateral movement of the cam is eliminated. The elements involved are precisely similar except by the interposition of an intermediate floating sleeve I accomplish the last mentioned object.

In the drawing, thrust-plate 90 with exactly the same function as hitherto described, supports pins 93. These pins 93 extend inwardly through openings in cam-carrier sleeve 79 terminating in slots 94 in intermediate sleeve 92. Sleeve 92, in effect, is an integral part of cam 4. It is shown locked into position between a shoulder and nut. The slots 94 in question could be formed in the cam 4 shaft as shown in Figure 19. This merely shows one of a variety of ways of construction. Therefore, considering cam 4 and sleeve 92 as a unitary structure, from the axial or lateral displacement of thrust-plate 90 it immediately follows that the translation of the position of pins 93 may only be accomplished by effecting a change in the relationship of said pins 93 to slots 94 in sleeve 92.

By design, the lateral movement of pins 93 may be converted into turning effort, and so it is that cam 4 must rotate with respect to cam-carrier sleeve 79 in the amount specified to attain the desired result.

Figure 24 is a detail showing sleeve 92, pin 93, and slot 94.

As I have previously mentioned, anything that may shorten the length of time consumed in effecting synchrony between propeller and machine gun is an important desideratum. In Figure 11, I have shown a construction that accomplishes this, a construction having universal latitude, in this case, 360 degrees, in the proper relationship between the gun synchronizer drive shaft and the impulse motor shaft, effecting this without necessity of removing the synchronizer unit from its position on the engine. In those cases where an adjustment through a 360 degree range is not necessary, but on the other hand only a limited latitude in adjustment, predicted on an approximately correct installation in the first instance, I offer a simple solution:

In Figure 25 I show one construction in which spiral splines are utilized to attain a considerable amount of latitude in after-installation adjustment. The latitude offered is, of course, a function of the amount of lead possessed by the said spiral splines.

Referring to the drawings, cam 4 is shown, having formed thereon spiral splines 97; mating with spiral splines 97 is splined sleeve 98, the bore of which mates with said spiral splines 97, and on the outer cylindrical surface of which are formed screw threads. Mating with the screw threads on splined sleeve 98 are screw threads in the bore of adjustment collar 99. Adjusting collar 99, while free to be turned in cam-carrier 96, is by design restrained from all lateral movement with respect to said cam carrier 96. Conveniently disposed in the periphery of adjusting collar 99 are spanner holes 99a by which through slots 103 in cam-carrier 96, said adjusting collar 99 may be turned. Access to slots 103 in cam-carrier 96 may be gained by means of openings 15c through the walls of synchronizer housing 15, the location of such an opening being shown with plug closure 105 in place. I may point out that dogs 100 on splined sleeve 98 interlocking with dogs 101 on dog-carrier 102. The sequence of events in making an adjustment is as follows: It is assumed that the synchronizer, at the time of installation, is roughly correctly synchronized, a matter of but a few degrees out of synchrony. Access is had to adjusting collar 99 in the fashion above indicated. Adjusting collar 99 is turned. The rotation of this, in view of its own retention against lateral movement may result only in an effort to carry splined sleeve 98 with it. However, in view of the impossibility of rotation of the latter, springing from the interlocking of dogs 100 with dogs 101 splined sleeve 98 may only move laterally, provision for such movement being made in the design of cam-carrier 96. It will be appreciated that the movement of splined sleeve 98 will change the relative interlocking position of the dogs. As splined sleeve 98 moves laterally with respect to splines 97 on cam 4, the latter being, by design, prevented from axial or lateral movement, in this case with respect to cam-carrier 96—and for illustration shown accomplished by pin 95 splines 97 must respond by following the mating splines in splined sleeve 98. In so doing cam 4 is turned, and insomuch as cam 4 is turned, is the phase relation between gun synchronizer drive shaft and synchronizer impulse motor shafts changed. The relationship between propeller position and the time of gun fire may be quickly checked, and further correction, if necessary, made. The time-saving involved will be understood, since no longer is it necessary to remove the unit to change the cam setting. From time to time or as required, adjustment to compensate for wear may be made in adjusting the cam position, this being a matter of minutes only, if not seconds, as the synchronizer proper, impulse cable, trigger pin cable, etc., are not disturbed.

While I have previously shown constructions permitting rapid adjustment of the cam to effect the desired synchrony, in many cases the use of a universally or partially adjustable cam arrangement is not feasible, and for those cases I show a method eliminating in large measure the trial-and-error procedure hitherto practised in attaining the desired end. In Figure 27 I show, diagrammatically, the train existing between propeller and the engine gun synchronizer drive shaft, the latter terminating in a splined end. I indicate the train by a series of pulleys, and a belt. Describing the drawings, the propeller blades 106 and 107 are connected in the manner indicated by means of pulley 111, belt 110, pulleys 112 and 113 with pulley 114 driving gun synchronizer drive shaft 1 terminating in splines 2. Machine gun muzzle 108 is shown at an angle with the center line of the propeller, the latter placed in a vertical position, center line 109 passing through the line of gun-fire. The propeller is to be understood as turning clockwise, and passes, of course, through the line of fire. With the propeller placed vertically with respect to the designed horizontal axis of the engine, an index line in this case, O—O, is placed in a convenient position on gun synchronizer drive shaft—for example; this may be scribed on one particular spline. This index may be placed in some definite relation to a stationary index, scribed for instance, on the crank-case gun synchronizer mounting flange, or an index on the latter may be placed thereon in register with that on the spline. If, now, a circular dial 115 properly marked, in degrees, with a central clearance hole 117 and dowel pin holes 116 is placed on the engine crank-case gun synchronizer mounting flange, dowels in the latter locating said dial 115 by virtue of the dowel pin holes 116 the dial 115 we have established a very definite means for placing the cam correctly, and on the first essay. If now pointer 118 with splines 119 mating with those on gun synchronizer drive shaft 2 with the pointer coinciding with the zero line on dial 115 is slipped over splines 2 and the propeller is turned clockwise until the center-line of blade 107, in this case, is pierced by the line of fire, pointer 118 will move over the face of dial 115. It follows that the angularity between the vertical and the new gun fire intercepting position of the propeller may be immediately read on dial 115. To illustrate, let us assume the pointer had moved from zero setting to 132 degrees. Again, for purposes of illustration assume that experience has, for this particular installation, disclosed that the synchronizer should prevent all gun fire from a point 25 degrees in advance of the arrival of the propeller blade in front of the particular machine gun muzzle 108, this allowing for lag, and other extraneous influences. If, therefore, the propeller be turned counter-clockwise until 25 degrees has been subtracted from 132 degrees, that is until the pointer 118 coincides with 107 degrees on dial 115 the propeller is now in the position at which the gun must not fire. If the cam 4 is now mounted on gun synchronizer drive shaft in such position as to retract impulse motor shaft 9 to the maximum, that is, if the cam is placed with its major axis coincident in direction with the axis of the cam follower, proper synchrony will be had.

I have hitherto discussed constructions utilizing, primarily impulse motor shafts functioning at right angles, or, angularly, directly above the source of power-supply and converting at the same time rotary into reciprocating motion. However, as previously recited, an occasional installation requires a synchronizer in which the reciprocating power supply must be offset or staggered with respect to the original source of rotary motion. I show, in Figures 30, 31 and 32 how I do this, retaining the vital features of simplicity, minimum wear, minimum weight, etc., while at the same time the construction shown, lends itself, as will be perceived, particularly well to orientation of the impulse motor shaft. In Figure 31, I show a combination in one synchronizer unit of several of the features more particularly, and singly, discussed previously, although it had, hitherto, been entirely obvious that any desired combination of functions, or a combination of all functions could be incorporated into and become an integral part of the synchronizer unit. Figure 33 is an enlarged detail showing a combination of the various elements combined in the structure shown in Figures 30, 31 and 32, the latter, Figure 32, being a top view of the structure shown in Figure 30.

Describing now the drawings in Figure 30, I show a partial section on 30—30 of the structure shown in Figure 32. My main elements remain as hitherto. I show cam 4 operating in conjunction with roller 7 and what has hitherto been cam follower and primary impulse motor shaft 9 becomes simply a cam follower, the need for more than one impulse motor shaft disappears, the secondary impulse motor shaft acquiring a more or less universal function. The same gear train, rack, pinion and rack are utilized, but in somewhat different fashion. Pinion 17 oscillating about pinion gear stud 19 in this case has a companion gear 17a, shown in Figure 31, integral therewith, this integration being effected by any of the well-known mechanical means, as here shown the pinions being a unit, being joined by a sleeve. The mechanism for retention shown follows the practice revealed in Figure 5. Co-acting with pinion gear 17a, is impulse motor shaft 21 which in this case reciprocates in impulse motor shaft housing 120, the latter being attached to synchronizer housing 15 by mating flanges rigidly held together by means of machine screws or other mechanical means. It will readily be observed that, by design, impulse motor shaft 21 may be oriented about pinion gear stud 19 central thereto, as well as to the gear containing recess in synchronizer housing 15. To attain the degree of latitude in adjustment, in orienting impulse motor housing 120 a series of threaded holes 122 may be formed in the synchronizer housing flange mating with that on the impulse motor shaft housing 120. The practice may well be that shown in Figure 2.

To attain still greater refinement in placement, the recited flange on impulse motor shaft housing 120 may have the machine screw, or bolt holes elongated as shown in detail in Figure 15. In Figure 30 I also show another construction increasing still further the more or less universal adaptability of my invention. I show cover housing 121 replacing the more conventional arrangement shown in Figures 1, 2 and 3, this cover housing 121 having a flange corresponding to the flange on trigger pin housing 16 and similarly on synchronizer housing 15 a mating flange identical to that with which the trigger pin housing 16 mates. The significance of this is that for convenience of installation, cover housing 121 and the trigger pin housing 16 may be interchanged end for end. The only difference in operation when so reversed is that to arrest the operation of the machine gun, the trigger pin 28 instead of pulling roller 7 from the rolling surface of cam 4 will, in effect, push it out of contact, by virtue of the design of the engaging end of the trigger pin. It will be observed that any reasonable offset or stagger motor shaft 21 with respect to cam follower 9 is attainable. For sake of clearness, keys and keyways are not shown.

Referring to Figure 33 which is an enlarged detail of the drive between engine gun synchronizer drive shaft 1 the cam follower 9 shown in Figure 31, on section 31—31 of Figure 30, governor bowl 75 for purposes of illustration, has formed in its lower end a splined recess mating with splines on the end of the shaft mentioned. Centrifugal force is here harnessed in precisely the same way as is set forth in the description of Figure 23. However, instead of direct actuation of cam 4 as hereinbefore recited, the actuation in this case is directly to the cam carrier, 79 and not as in the former case to sleeve 92 nor directly to the shaft of cam 4. The function of cam carrier 79 in Figure 23 becomes, in effect, the same as driving sleeve 96a in Figure 25. The construction, in train, toward the cam, parallels the construction shown in Figure 25 and other explanation would not seem necessary.

While I have illustrated and described my invention with some degree of particularity, I realize that in practice, various alterations and modifications therein may be made. I therefore reserve the right and privilege of changing the form of the details of construction, or otherwise altering any arrangement of parts without departing from the spirit of the invention or the scope of the claims that follow.

It will be apparent that any form of the synchronizer shown herein may be utilized in the operation of two machine guns simultaneously, the only requirement being that impulse cables be connected to the two impulse shafts and to the two machine guns, with the guns properly oriented relative to the propeller.

Having thus described my invention, what I claim as new and desire to protect by United States Letters Patent, is:

I claim:

1. In a gun synchronizer for attachment to an engine, a casing, a reciprocable member therein, a second reciprocable member in said casing operatively connected to the first member for reciprocation therewith, said second member being arranged at an angle to the first member, means attachable to either member to connect it to an operating part of the gun, said means being actuated by said operating part of the gun to move said member in one direction, cam means to move the member in the opposite direction, and means to render the first-named means ineffective at will, the relative angularity of said members being such that one thereof is accessible for connection to an operating part of the gun when engine construction renders the other member inaccessible for such connection.

2. In a gun synchronizer, a reciprocable member, a second reciprocable member operatively connected to the first member for reciprocation therewith, said second member being disposed in angular relation to the first member and being connected to the first member by a rack-and-pinion, means attachable to either member to connect it to an operating part of the gun, said means being actuated by said operating part of the gun in one direction, cam means to move the member in the opposite direction, and means to render the first-named means ineffective at will.

3. In a gun synchronizer, a reciprocable member, a second reciprocable member operatively connected to the first member for reciprocation therewith, said second member being arranged at an angle to the first member, means attachable to either member to connect it to an operating part of the gun, said means being actuated by said operating part of the gun to move said member in one direction, cam means to move the member in the opposite direction, and means to render the first-named means ineffective at will comprising a pin normally biased to seat in a channel formed transversely in one of said members.

4. In a gun synchronizer, a reciprocable member, a second reciprocable member operatively connected to the first member for reciprocation therewith, said second member being arranged at an angle to the first member, means attachable to either member to connect it to an operating part of the gun, said means being actuated by said operating part of the gun to move said member in one direction, cam means to move the member in the opposiate direction, means to render the first-named means ineffective at will comprising a pin normally biased to seat in a channel formed transversely in one of said members, and a housing having a guideway therein for said pin, said housing being adjustable about the line of reciprocation of said channeled member.

5. In a gun synchronizer, a reciprocable member, a second reciprocable member operatively connected to the first member for reciprocation therewith, said second member being arranged at an angle to the first member, said members being keyed together for relative movement in a common plane, means attachable to either member to connect it to an operating part of the gun, said means being actuated by said operating part of the gun to move said member in one direction, cam means to move the member in the opposite direction, and means to render the first-named means ineffective at will.

6. In a gun synchronizer, a casing therefor, a reciprocable member mounted in said casing, engine driven cam means for moving said reciprocable member in one direction, means connecting said member to an operating part of the gun and operated by the operating part of the gun to move said member in the opposite direction to cause it to follow said cam, a locking member housing secured to said casing and provided with a guideway, a locking member movable in said guideway to engage said reciprocable member to lock it against reciprocation, said housing being adjustable about the line of reciprocation of said reciprocable member.

7. In a gun synchronizer, a casing therefor, a reciprocable member mounted in said casing, a second reciprocable member mounted in said casing and operatively connected to the first member for reciprocation therewith, engine driven cam means for moving one of said reciprocable members in one direction, means connecting one of said members to an operating part of the gun and operated by the actuating part of the gun to move said member in the opposite direction, a locking member housing secured to said casing and provided with a guideway, a locking member movable in said guideway to engage one of said reciprocable members to lock it against reciprocation, said housing being adjustable about the line of reciprocation of said reciprocable member.

8. In a gun synchronizer, a casing therefore, a reciprocable member mounted in said casing, engine driven cam means for moving said reciprocable member in one direction, means connecting said member to an operating part of the gun and operated by the actuating part of the gun to move said member in the opposite direction to cause it to follow said cam, said member being provided with an annular formation, a locking member housing secured to said casing and provided with a guideway, a locking member movable in said guideway to engage the annular formation of said reciprocable member to lock it against reciprocation, said housing being adjustable about the line of reciprocation of said reciprocable member.

9. In a gun synchronizer, a casing therefor, a reciprocable member mounted in said casing, a second reciprocable member mounted in said casing and operatively connected to the first member for reciprocation therewith, engine driven cam means for moving said reciprocable member in one direction, means connecting one of said members to an operating part of the gun and operated by the actuating part of the gun to move said member in the opposite direction, one of said members being provided with an annular formation, a locking member housing secured to said casing and provided with a guideway, a locking member movable in said guideway to engage said annular formation to lock said members against reciprocation, said housing being adjustable about the line of reciprocation of the reciprocable member having the annular formation.

10. In a gun synchronizer, a reciprocable member, a second reciprocable member operatively connected to said first member for reciprocation therewith, said second member being disposed in angular relation to the first member and being connected to the first member by a rack and pinion, means attachable to said members to connect them to operating parts of guns, said means being actuated by said operating parts of the guns to move said members in one direction, cam means associated with one of said members to move the members in the opposite direction, and means to render the first named means ineffective at will.

11. In a gun synchronizer, a reciprocable member, a second reciprocable member operatively connected to the first member for reciprocation therewith, said second member being arranged at an angle to the first member, means attachable to said members to connect them to operating parts of guns, said means being actuated by said operating parts of the guns to move said members in one direction, cam means associated with one of said members to move the members in the opposite direction, and means to render the first named means ineffective at will comprising a pin normally biased to seat in a channel formed transversely in one of said members.

12. In a gun synchronizer, a reciprocable member, a second reciprocable member operatively connected to the first member for reciprocation therewith, said second member being arranged at an angle to the first member, said members being connected together for relative movement in a common plane, means attachable to said members to connect them to operating parts of guns, said means being actuated by said operating parts of the guns to move said members in one direction, cam means associated with one of said members to move the members in the opposite direction and means to render the first named means ineffective at will.

13. In a gun synchronizer, a reciprocable member, a second reciprocable member operatively connected to the first member for reciprocation therewith, separate means attachable to said members to connect them respectively to operating parts of separate guns, said means being actuated by said operating parts of the guns to move said members in one direction, cam means associated with one of said members to move the members in the opposite direction, and means to render the first named means ineffective at will.

14. In a gun synchronizer, a reciprocable member, a second reciprocable member, means connecting said reciprocable members whereby the members are simultaneously reciprocated, said second member being adjustable relative to the first whereby the angle of reciprocation of the second member relative to the first member can be varied, means attachable to either of said members to connect it to an operating part of the gun, said means being actuated by said operating part of the gun to move said member in one direction, cam means associated with one of said members for moving said members in the opposite direction, and means for locking said members against reciprocation at will.

15. In a gun synchronizer, a reciprocable member, a second reciprocable member, means connecting said reciprocable members whereby the members are simultaneously reciprocated, said second member being adjustable relative to the first whereby the angle of reciprocation of the second member relative to the first member can be varied, means attachable to said members to connect them to operating parts of guns, said means being actuated by said operating parts of the guns to move said members in one direction, cam means associated with one of said members for moving said members in the opposite direction, and means for locking said members against reciprocation at will.

16. In a gun synchronizer, a reciprocable member, a second reciprocable member, means connecting said reciprocable members whereby the members are simultaneously reciprocated, said second member being adjustable relative to the first whereby the angle of reciprocation of the second member relative to the first member can be varied, means attachable to either of said members to connect it to an operating part of the gun, said means being actuated by said operating part of the gun to move said member in one direction, cam means associated with one of said members for moving said members in the opposite direction, a housing having a guideway therein, and a locking member movable in said guideway to engage one of said members to lock said members against reciprocation, said housing being adjustable about the line of reciprocation of the member engaged by the locking member.

17. In a gun synchronizer, a reciprocable member, a second reciprocable member, means connecting said reciprocable members whereby the members are simultaneously reciprocated, said second member being adjustable relative to the first whereby the angle of reciprocation of the second member relative to the first member can be varied, means attachable to said members to connect them to operating parts of guns, said means being actuated by said operating parts of the guns to move said members in one direction, cam means associated with one of said members for moving said members in the opposite direction, a housing having a guideway therein, and a locking member movable in said guideway to engage one of said members to lock said members against reciprocation, said housing being adjustable about the line of reciprocation of the member engaged by the locking member.

18. In a gun synchronizer for attachment to an engine, a casing, a reciprocable member therein, a second reciprocable member in said casing operatively connected to the first member for reciprocation therewith, said second member being arranged at an angle to the first member, means attachable to either member to connect it to an operating part of the gun, said means being actuated by said operating part of the gun to move said member in one direction, cam means driven by said engine to move the member in the opposite direction, means to render the first-named means ineffective at will, the relative angularity of said members being such that one thereof is accessible for connection to an operating part of the gun when engine construction renders the other member inaccessible for such connection, and means for varying the relation between the cam and the engine to compensate for variation in lag in the train of mechanism caused by variations in engine speed.

19. In a gun synchronizer for attachment to an engine, a casing, a reciprocable member therein, a second reciprocable member in said casing operatively connected to the first member for reciprocation therewith, said second member being arranged at an angle to the first member, means attachable to either member to connect it to an operating part of the gun, said means being actuated by said operating part of the gun to move said member in one direction, cam means driven by said engine to move the member in the opposite direction, means to render the first-named means ineffective at will, the relative angularity of said members being such that one thereof is accessible for connection to an operating part of the gun when engine construction renders the other member inaccessible for such connection, and manually operable means for varying the relation between the cam and the engine to compensate for variation in lag in the train of mechanism caused by variations in engine speed.

20. In a gun synchronizer for attachment to an engine, a casing, a reciprocable member therein, a second reciprocable member in said casing operatively connected to the first member for reciprocation therewith, said second member being arranged at an angle to the first member, means attachable to either member to connect it to an operating part of the gun, said means being actuated by said operating part of the gun to move said member in one direction, cam means driven by said engine to move the member in the opposite direction, means to render the first-named means ineffective at will, the relative angularity of said members being such that one thereof is accessible for connection to an operating part of the gun when engine construction renders the other member inaccessible for such connection, and automatically operating means for varying the relation between the cam and the engine to compensate for variation in lag in the train of mechanism caused by variations in engine speed.

21. In a gun synchronizer for attachment to an engine, a casing, a reciprocable member therein, a sleeve member rotatable in said casing and driven by said engine, a cam rotatable in said casing for moving said reciprocable member in one direction, said cam having a stem fitting in said sleeve, a worm gear on the end of the stem within said sleeve, a worm mounted in said sleeve and engaging said worm gear to provide a driving coupling between the sleeve and the cam stem, said worm being rotatable to rotate said stem relative to said sleeve whereby the position of the eccentric part of the cam relative to any given location on said sleeve can be varied.

22. In a gun synchronizer for attachment to an engine, a casing, a reciprocable member therein, a sleeve member rotatable in said casing and driven by said engine, a cam rotatable in said casing for moving said reciprocable member in one direction, said cam having a stem fitting in said sleeve, a worm gear on the end of the stem within said sleeve, a worm mounted in said sleeve and engaging said worm gear to provide a driving coupling between the sleeve and the cam stem, said worm being rotatable manually while the sleeve is at rest to rotate said stem relative to said sleeve whereby the position of the eccentric part of the cam relative to any given location on said sleeve can be varied, said casing being provided with an opening for rendering said worm accessible for rotating the same.

JAMES E. DIAMOND.